United States Patent
Wu

(10) Patent No.: US 7,298,448 B2
(45) Date of Patent: Nov. 20, 2007

(54) LIQUID CRYSTAL DISPLAY WITH A UNIFORM COMMON VOLTAGE AND METHOD THEREOF

(75) Inventor: Yang-En Wu, Taipei (TW)

(73) Assignee: AU Optronics Corp., Hsin-Chu (TW)

( * ) Notice: Subject to any disclaimer, the term of this patent is extended or adjusted under 35 U.S.C. 154(b) by 0 days.

(21) Appl. No.: 10/708,330

(22) Filed: Feb. 24, 2004

(65) Prior Publication Data

US 2004/0201813 A1 Oct. 14, 2004

(30) Foreign Application Priority Data

Apr. 10, 2003 (TW) ............... 92108283 A

(51) Int. Cl.
G02F 1/1335 (2006.01)

(52) U.S. Cl. ............ 349/155; 349/156; 349/157; 349/106; 349/110

(58) Field of Classification Search ......... 349/106, 349/107, 108, 155–157, 110
See application file for complete search history.

(56) References Cited

U.S. PATENT DOCUMENTS

| | | | | |
|---|---|---|---|---|
| 5,748,266 A * | 5/1998 | Kodate | .................. | 349/39 |
| 5,917,572 A * | 6/1999 | Kurauchi et al. | ........... | 349/156 |
| 6,275,280 B1 * | 8/2001 | Kajita et al. | ................. | 349/155 |
| 6,795,141 B2 * | 9/2004 | Yamada | ....................... | 349/106 |
| 6,862,050 B2 * | 3/2005 | Rho et al. | ..................... | 349/44 |
| 6,930,747 B2 * | 8/2005 | Lee | ............................. | 349/155 |
| 6,965,419 B2 * | 11/2005 | Nishida et al. | ............. | 349/106 |
| 2001/0026347 A1 * | 10/2001 | Sawasaki et al. | .......... | 349/156 |
| 2002/0060771 A1 * | 5/2002 | Sumino et al. | ............. | 349/156 |
| 2002/0075441 A1 * | 6/2002 | Fujimori et al. | ............ | 349/155 |
| 2002/0109815 A1 * | 8/2002 | Hirakata et al. | ............ | 349/155 |
| 2002/0171800 A1 * | 11/2002 | Miyazaki et al. | ............ | 349/156 |
| 2004/0027529 A1 * | 2/2004 | Sasaki | ........................ | 349/156 |

* cited by examiner

Primary Examiner—David Nelms
Assistant Examiner—(Nancy) Thanh-Nhan P Nguyen
(74) Attorney, Agent, or Firm—Winston Hsu

(57) ABSTRACT

An LCD with a uniform common voltage and a method thereof. The present invention method includes providing a lower substrate, forming scan lines and data lines, then forming common electrodes and common electrode pads electrically connecting the common electrodes. The method also includes providing an upper substrate, forming photo spacers corresponding to each of the electrode pad, then forming a conductive material layer covering each photo spacer, combining the two substrates and connecting the conductive material layer on the photo spacers to the common electrode pads, and sealing the two substrates.

14 Claims, 5 Drawing Sheets

LIQUID CRYSTAL DISPLAY WITH A UNIFORM COMMON VOLTAGE AND METHOD THEREOF

BACKGROUND OF INVENTION

1. Field of the Invention

The invention relates to a liquid crystal display (LCD), and more particularly, to a LCD with a uniform common voltage and a method thereof.

2. Description of the Prior Art

Since the LCD has the advantages of portability, low power consumption, and low radiation, the LCD has been widely used in various portable information products, such as notebooks, personal digital assistants (PDA), video cameras, and etc. Furthermore, the LCD even has a potential to replace the CRT monitor or the television gradually.

In the conventional TFT-LCD process, spacers, such as plastic beads, glass beads, or glass fibers, are positioned by spraying, and tend to be mal-distributed, for maintaining the thickness of the cell gap between two substrates of the TFT-LCD and controlling the cell gap to a specific value to ensure the display performance. Consequently, the contrast of the TFT-LCD is affected due to light scattering by the spacers that are positioned in the light transmitting regions, generating white point defects and reducing yield rates and the display performance. For this reason, photo spacers formed by a photolithographic process have been developed to replace the conventional plastic beads to control the dimensions and positions of the spacers and the uniformity of the cell gap accurately to raise the display performance.

Please refer to FIG. 1 and FIG. 2. FIG. 1 is a schematic diagram of a LCD 10 according to the prior art, and FIG. 2 is a section view of the structure of the LCD 10 shown in FIG. 1. As shown in FIG. 1, the LCD 10 has a display area 12 and a non-display area 14 surrounding the display area 12. The display area 12 contains a plurality of data lines 16 and a plurality of scan lines 18 arranged perpendicular to the data lines 16 to form a pixel matrix (comprising a plurality of pixels 20), and a plurality of pixel drivers comprising a plurality of electrical elements, such as thin film transistors (TFTs) and capacitances, positioned on each intersection of the scan lines 18 and the data lines 16. The non-display area 14 contains package testing materials, signal transmitting wires, such as periphery circuit elements, repair lines, and tape carrier packages (TCPs) 26, and a plurality of silver paste points uniformly positioned in the non-display area 14. In the viewpoint of structure, the LCD 10 comprises a lower substrate 22, an upper substrate 24, and a plurality of liquid crystal molecules (not shown) filled between the lower substrate 22 and the upper substrate 24. The upper surface of the lower substrate 22 contains the data lines 16, the scan lines 18, the TCPs 26 (in the non-display area 14), and the TFTs (not shown). Each data line 16 and scan line 18 are electrically connected to their corresponding TCPs 26 for transmitting signals to the lower substrate 22 so that the LCD 10 can show an image. Each of the TFTs is positioned in an intersection of the data lines 16 and the scan lines 18 as a switch element of the pixel 20. The lower substrate 22 further contains a plurality of pixel electrodes 28 formed by a transparent conductive material layer electrically connected to the TFTs, and an alignment film (not shown) covering the TFTs and the pixel electrodes 28 for aligning the arranging direction of the liquid crystal molecules.

As shown in FIG. 2, the bottom surface of the upper substrate 24 contains a plurality of black matrixes 32, a plurality of color filters 34, a transparent conductive material layer as a counter electrode 36 of the LCD 10, and a plurality of photo spacers 38. There are three kinds of color filters 34: red color filters 34a, green color filters 34b, and blue color filters 34c. Each of the pixels 20 comprises all three kinds of the color filters 34. The black matrixes 32 are set on the border between each of the color filters 34 and the upper substrate 24. The counter electrode 36 covers over the surface of the color filters 34 to provide a voltage for the operation of the LCD 10. The photo spacers 38 are transparent or nontransparent minute columns, and they are used for replacing the spacers in the conventional LCD. The distribution density of the photo spacers 38 varies according to different manufacturing designs. The main consideration of the design of the distribution density is to make the photo spacers 38 arrange uniformly in the whole plane of the LCD 10 to support the cell gap between the upper substrate 24 and the lower substrate 22, and maintain the thickness of the cell gap. The process of fabricating the LCD 10 according to the prior art is to form the photo spacer 38 on the counter electrode 36 by lithography process after depositing the counter electrode 36 on the bottom surface of the upper substrate 24. Besides, the bottom surface of the upper substrate 24 can further comprise an alignment film covering the surface of the counter electrode 36.

The driving method of the conventional LCD 10 is described as follows. When showing an image, the counter electrode 36 provides a stable common voltage. And the TCPs 26 on the non-display area 14 transmits data signals to the data lines 16 to provide pixel voltages to each pixel electrode 28 through the TFT in each of the pixels 20, and then the electric field between the common voltage and the pixel voltage in each pixel affects the liquid crystal molecules in the pixel to turn to a certain direction so that a certain amount of light beams are allowed to pass through the liquid crystal material layer to display an image on the LCD 10. Therefore having a stable common voltage or stable pixel voltages is one of the key points of the LCD 10 for presenting a high quality image.

According to the conventional method for providing the common voltage, the common voltage is transmitted by wires to the lower substrate 22, and then to the counter electrode 36 of the upper substrate 24 by the silver paste points to diffuse the common voltage to the whole plane of the LCD 10 to make the LCD 10 have a same common voltage. However, the counter electrode 36 of the LCD 10 according to the prior art is usually composed of indium tin oxide (ITO), which has a high impedance of about 90Ω per unit area. Furthermore, silver paste points for transmitting the common voltage are only positioned in the periphery of the LCD 10 (in the non-display area 14). Therefore as the common voltage is transmitted through the silver paste points and the counter electrode 36 in the periphery portion of the LCD 10 to the counter electrode 36 in the middle portion of the LCD 10, the common voltage will have a voltage drop because of the high impedance of the counter electrode 36 composed of ITO, especially when the LCD 10 is a large-size LCD. When the size of the LCD 10 is large, the voltage drop problem will be more serious so that the common voltage of the upper substrate 24 will be so non-uniform that the LCD 10 cannot accurately maintain the turning directions of the liquid crystal molecules. Thus the LCD 10 will fail to present the best images. As a result, to provide a LCD with a uniform common voltage and the method thereof is still an important issue in LCD manufacturing and industry.

SUMMARY OF INVENTION

It is therefore a primary objective of the claimed invention to provide a LCD with a uniform common voltage and a method thereof to solve the above-mentioned problem.

According to the claimed invention, a method for fabricating a LCD with a uniform common voltage is provided. The method comprising: providing a lower substrate; forming a plurality of scan lines and a plurality of data lines on an upper surface of the lower substrate, wherein the scan lines are arranged perpendicular to the data lines to form a pixel matrix comprising a plurality of pixels; then forming a plurality of common electrodes for transmitting a common voltage and a plurality of common electrode pads electrically connected to the common electrodes on the lower substrate; providing an upper substrate; forming a plurality of photo spacers on the bottom surface of the upper substrate to make each of the photo spacers correspond to one of the common electrode pads; forming a conductive material layer on the bottom surface of the upper substrate to make the conductive material layer cover the surface of the photo spacers; combining the upper substrate and the lower substrate face to face by using the photo spacers to support the space between the upper substrate and the lower substrate and electrically connecting the conductive material layer covering the surface of each of the photo spacers to the common electrode pads corresponding to each of the photo spacers; and filling a plurality of liquid crystal molecules in the space between the upper substrate and the lower substrate and sealing the space between the upper substrate and the lower substrate.

It is an advantage of the claimed invention that the photo spacers are first formed on the upper substrate of the LCD, then the conductive material layer is formed on the surface of the photo spacer for electrically connecting the conductive material layer directly to the common electrode pads of the lower substrate and the common electrodes, so that the common voltage can be transmitted from the common electrodes on the lower substrate directly to the conductive material layer covering photo spacer on the upper substrate. Furthermore, since the photo spacers are uniformly arranged on the whole plane of the LCD, the conductive material layer can have a uniform common voltage. Therefore the claimed invention can effectively solve the problem in the prior art that the common voltage is transmitted only by the silver paste points in the non-display area to the periphery portion of the conductive material layer of the upper substrate but with a voltage drop results in the conventional LCD panel having an non-uniform common voltage because of the high impedance of the conductive material layer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
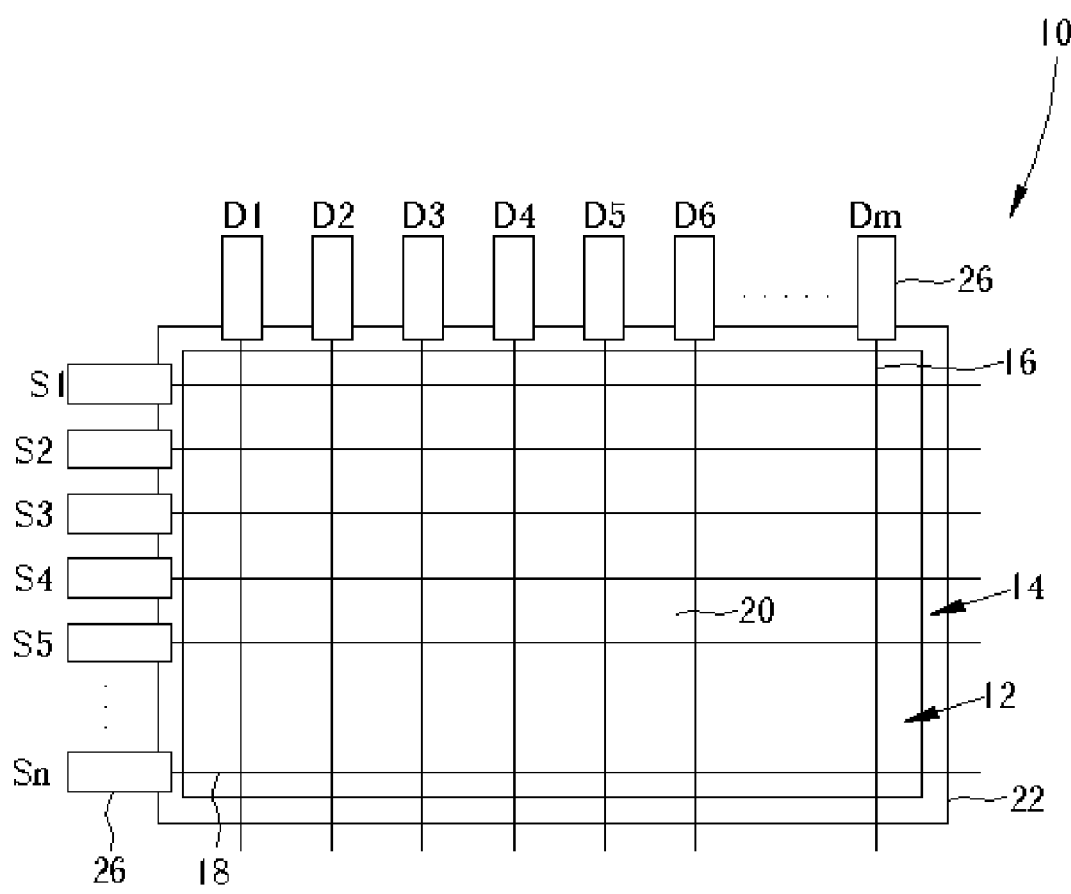
FIG. 1 is a schematic diagram of a LCD according to the prior art.
Figure 2:
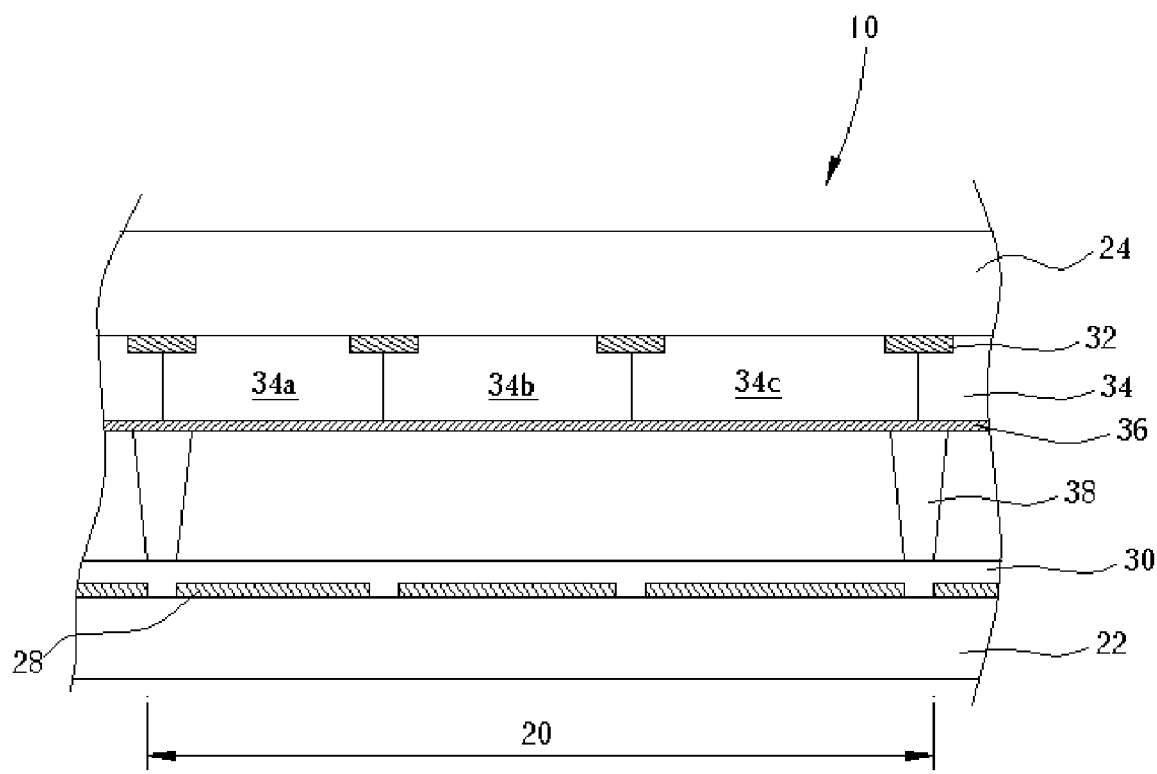
FIG. 2 is a section view of the structure of the LCD shown in FIG. 1.
Figure 3:
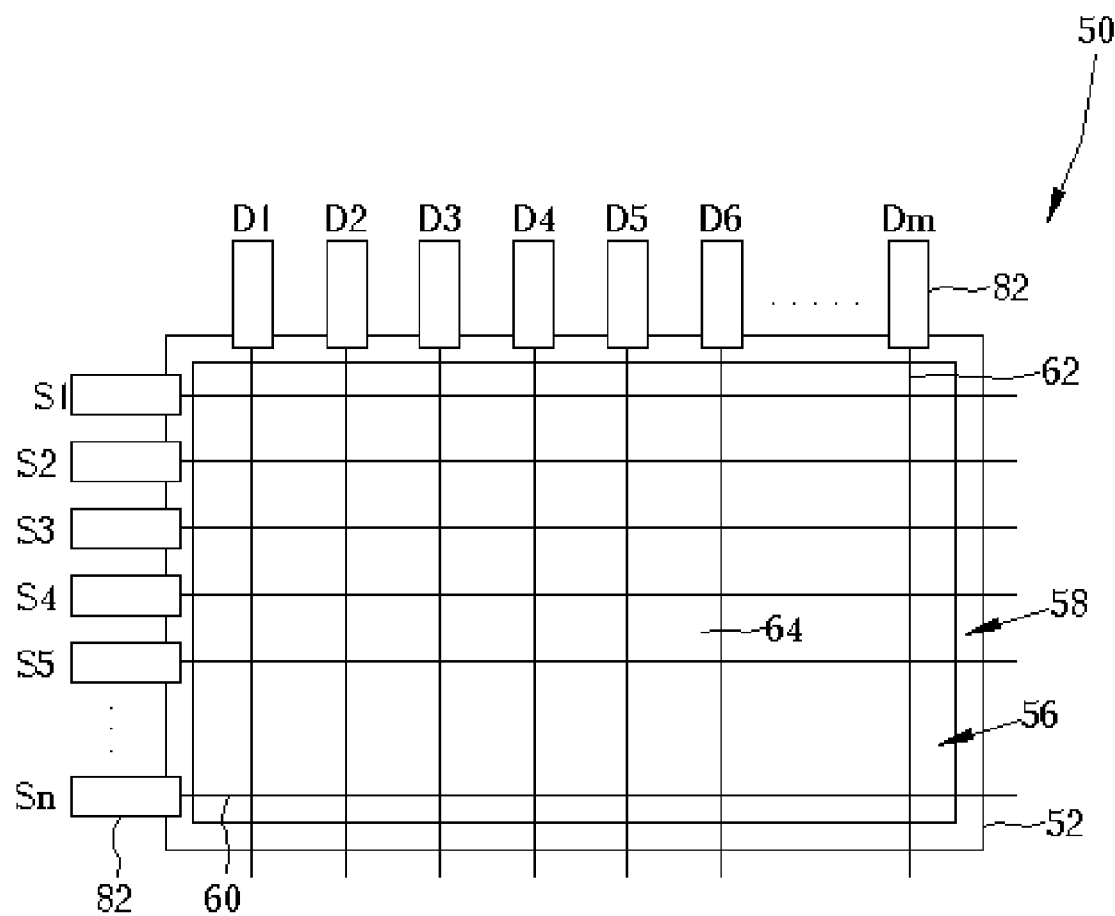
FIG. 3 is a schematic diagram of a LCD according to the present invention.
Figure 4:
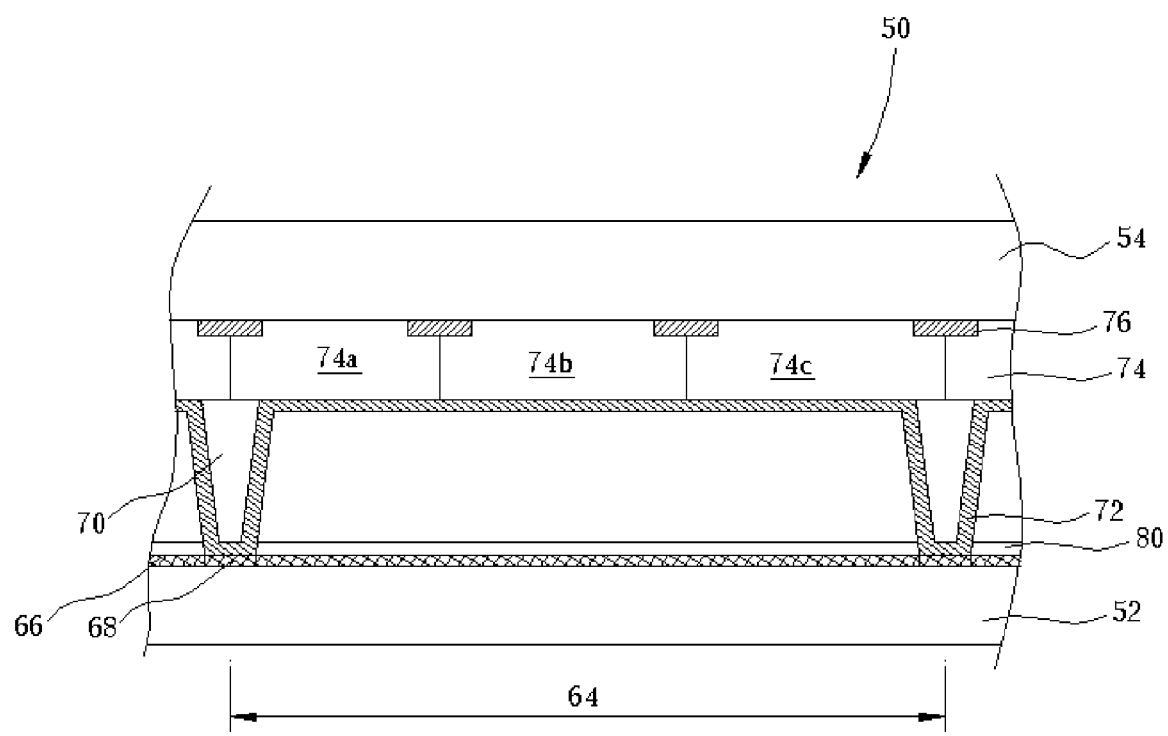
FIG. 4 is a section view of the structure of the LCD shown in FIG. 3.

Please refer to FIG. 3 and FIG. 4. FIG. 3 is a schematic diagram of a LCD 50 according to the present invention. FIG. 4 is a section view of the structure of the LCD 50 shown in FIG. 3. The present invention LCD 50 with a uniform common voltage comprises a lower substrate 52, an upper substrate 54 positioned on the lower substrate oppositely, and a plurality of liquid crystal molecules (not shown) filled between the lower substrate 52 and the upper substrate 54. The lower substrate 52 of the LCD 50 defines a display area 56 and a non-display area 58. The lower substrate 52 has a plurality of scan lines 60, a plurality of data lines 62, a plurality of pixels 64 defined by the scan lines 60 and the data lines 62 with intersection in the display area 56, a plurality of TFTs (not shown) positioned in each of the pixels 64, a plurality of common electrodes 66, a plurality of common electrode pads 68, and an alignment film 80 thereon. The common electrodes 66 and the common electrode pads 68 are composed of a metal material with a high conductivity, such as aluminum.

As shown in FIG. 4, on the bottom surface of the upper substrate 54 contains a plurality of photo spacers 70 and a conductive material layer 72 covering the photo spacers 70. The photo spacers 70 are used for maintaining the cell gap between the upper substrate 54 and the lower substrate 52. And the photo spacers 70 are arranged uniformly on the surface of the upper substrate 54 in the display area 56. For example, each of the pixels 20 contains a photo spacer 70. The conductive material layer 72 is used as a counter electrode of the LCD 50 similar to the counter electrode of a conventional LCD for supplying a stable common voltage on the whole plane of the surface of the upper substrate 54 to ensure the effect of the turning performance of the liquid crystal molecules. The upper substrate 54 further comprises a plurality of color filters 74, a plurality of black matrixes 76, and an alignment film (not shown), wherein the color filters 74 contains red color filters 74a, green color filters 74b, and blue color filters 74c. Each of the pixels 64 comprises a red color filter 74a, a green color filter 74b, and a blue color filter 74c. The black matrixes 76 are set on the border between each of the color filters 74 and the upper substrate 54 to prevent the color from being mixed up and to raise the contrast of the LCD 50. The present invention LCD 50 further comprises two polarizers (not shown) on the upper surface of the upper substrate 54 and the bottom surface of the lower substrate 52 respectively.

Since the conductive material layer 72 covering the photo spacers 70 corresponding to the common electrode pads 68 are electrically connected to the common electrode pads 68, and the common electrode pads 68 are arranged uniformly in the display area 56, thus the conductive material layer 72 covering the photo spacers 70 are electrically connected to the common electrodes 66. Therefore the common voltage from the common electrodes 66 can be transmitted to the conductive material layer 72 covering the photo spacers 70 directly. In another aspect for the consideration to the circuit arrangement of the lower substrate, some portions of the common electrodes 66 can serve as the common electrode pads 68. Therefore the conductive material layer 72 on the photo spacers 70 are directly electrically connected to each of the common electrodes 66.

It should be noticed that the present invention method could be applied to other LCD products, for example, a LCD with the color filter on a TFT (COT) structure or with the color filters directly on the substrate.

Figure 5:
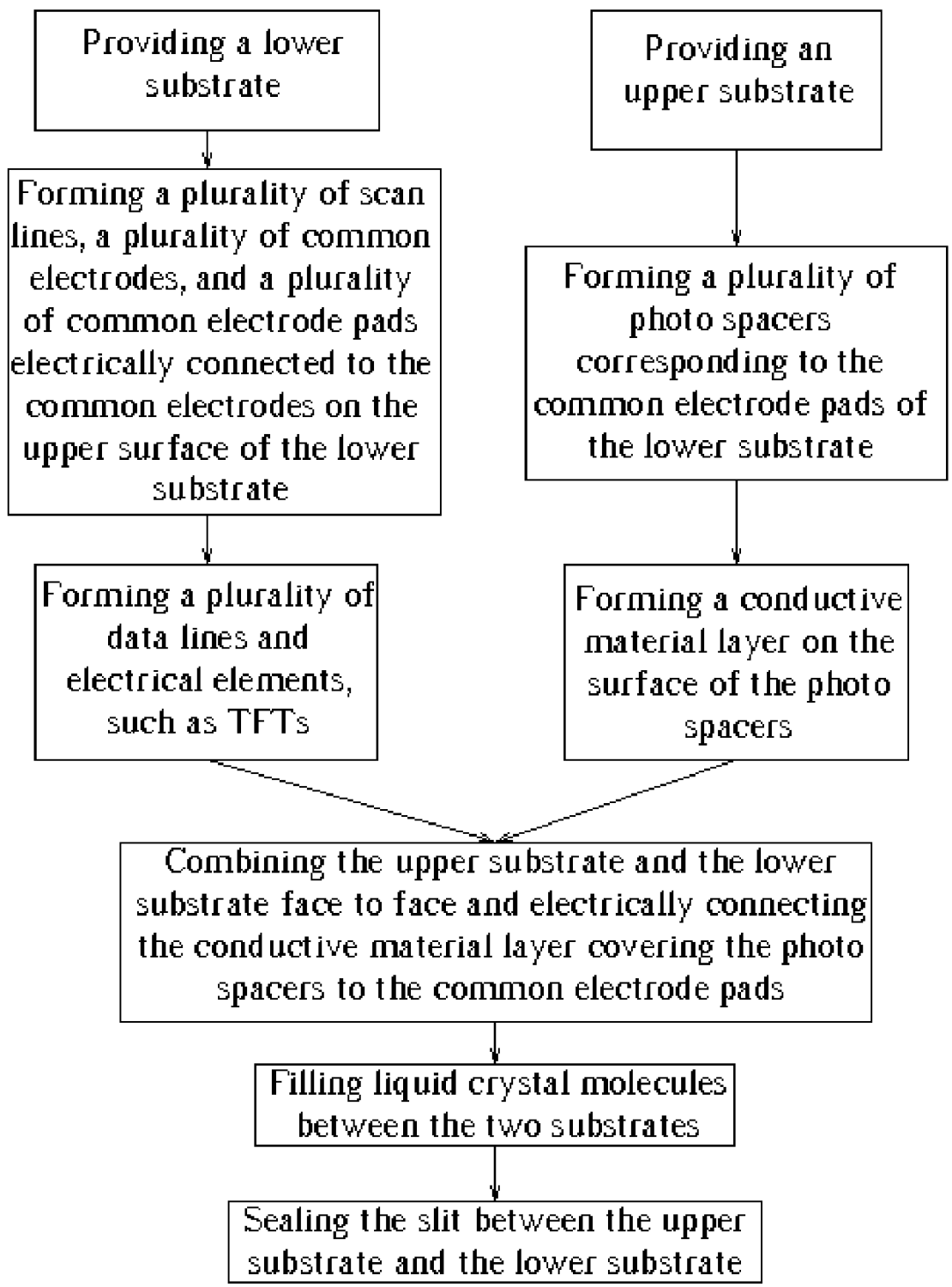
FIG. 5 is a flow diagram of a method for fabricating a LCD with a uniform common voltage according to the present invention.

Please refer to FIG. 5, which is a flow diagram of a method for fabricating a LCD with a uniform common voltage according to the present invention. The method comprises providing a lower substrate; forming a plurality of scan lines, a plurality of common electrodes for transmitting a common voltage, and a plurality of common electrode pads electrically connected to the common electrodes on the upper surface of the lower substrate; and then forming a plurality of data lines, a plurality of pixel electrodes, and electrical elements, such as TFTs, wherein the data lines are arranged perpendicular to the scan lines to form a plurality of pixels. The present invention method also comprises providing an upper substrate, forming a plurality of photo spacers corresponding to the common electrode pads of the lower substrate on the bottom surface of the upper substrate, and then forming a conductive material layer on the surface of the photo spacers. The present invention method further comprises combining the upper substrate and the lower substrate face to face by using the photo spacers on the bottom surface of the upper substrate to support the space between the two substrates, meanwhile electrically connecting the conductive material layer covering the photo spacers to each of the common electrode pads corresponding to each of the photo spacers; filling liquid crystal molecules between the substrates; and finally sealing the space between the upper substrate and the lower substrate. The present invention also comprises forming a plurality of color filters, two alignment films, and two polarizers with 90 degree differences on the surface of the upper substrate or the lower substrate, which are technologies known by those skill in the art, and thus more detailed information is not needed.

In contrast to the prior art, the present invention LCD uses the common electrodes on the lower substrate to transmit the common voltage to reach the goal of making the LCD have a uniform common voltage. The common electrodes on the surface of the lower substrate can be formed by a material with low impedance. In the embodiment of the present invention, the common electrodes are formed by aluminum, which has an impedance of 3-4Ω per unit area. The process of forming the common electrodes can be performed together with the scan lines by a same photo-etching-process (PEP), so that the common voltage can be transmitted to the conductive material layer on the surface of each of the photo spacers effectively, thus the common voltage on the surface of the upper substrate is uniform. As a result, the display performance and quality of the present invention LCD can be improved substantially. When applying the present invention, no new complicated processes are needed, and the present invention can be applied to the fabrication of a LCD with a large size to raise the yield rate of product.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for fabricating a liquid crystal display (LCD) with a uniform common voltage, the method comprising:
   providing a lower substrate having a display area and a non-display area;
   forming a plurality of scan lines, a plurality of common electrodes, and a plurality of common electrode pads on an upper surface of the lower substrate simultaneously, wherein the common electrodes are adapted to transmit a common voltage and are positioned at the same plane as a plane where the common electrode pads are positioned on the lower substrate, and the common electrode pads are electrically connected to the common electrodes;
   forming a plurality of data lines on the upper surface of the lower substrate, wherein the data lines are arranged substantially perpendicular to the scan lines to form a pixel matrix in the display area, the pixel matrix comprising a plurality of pixels;
   providing an upper substrate having a plurality of color filters, and black matrices disposed between adjacent color filters, the black matrices being covered by the color filters, and each color filter having a lower surface;
   forming a plurality of photo spacers on the upper substrate, each photo spacer being in direct contact with the lower surfaces of adjacent color filters, and corresponding to one of the black matrices and one of the common electrode pads on the lower substrate;
   forming a conductive material layer on the upper substrate and covering the surface of the photo spacers;
   combining the upper substrate and the lower substrate face to face by the photo spacers to support a space between the upper substrate and the lower substrate, and electrically connecting the conductive material layer covering the surface of each of the photo spacers to the common electrode pads corresponding to each of the photo spacers; and
   filling a plurality of liquid crystal molecules in the space between the upper substrate and the lower substrate, and sealing the space between the upper substrate and the lower substrate.

2. The method of claim 1 further comprising forming a plurality of thin film transistors (TFTs) on the upper surface of the lower substrate, wherein the TFTs are positioned on each intersection of the scan lines and the data lines as switching elements of the pixels.

3. The method of claim 2, wherein the lower substrate further comprises an alignment film having a plurality of openings disposed on the common electrodes, and the dimension of each photo spacer plus the dimension of the conductive material layer covering the photo spacer substantially equal to the dimension of each opening so that the alignment film is in contact with the conductive material layer.

4. The method of claim 1, wherein the color filters comprise red color filters, green color filters, and blue color filters.

5. The method of claim 1 further comprising forming a polarizer on a bottom surface of the lower substrate and forming a polarizer on an upper surface of the upper substrate.

6. The method of claim 1, wherein each of the pixels contains one of the photo spacers.

7. The method of claim 1, wherein the conductive material layer is a transparent indium tin oxide (ITO) layer.

8. A LCD with a uniform common voltage, the LCD comprising:
   a lower substrate having a display area and a non-display area on an upper surface thereof the lower substrate comprising:
      a plurality of scan lines and a plurality of data lines, wherein the data lines are arranged substantially perpendicular to the scan lines to form a pixel matrix in the display area, the pixel matrix comprising a plurality of pixels;

a plurality of common electrodes adapted to transmit a common voltage; and a plurality of common electrode pads electrically connected to the common electrodes, the common electrode pads and the common electrodes are positioned at a same plane on the lower substrate;

an upper substrate positioned on the lower substrate oppositely, the upper substrate comprising:

a plurality of color filters, and black matrices disposed between adjacent color filters, the black matrices being covered by the color filters, and each color filter having a lower surface;

a plurality of photo spacers positioned on the upper substrate for supporting a space between the upper substrate and the lower substrate, wherein each of the photo spacers is in direct contact with the lower surfaces of adjacent color filters and corresponding to one of the black matrices and one of the common electrode pads of the lower substrate; and a conductive material layer positioned on the upper substrate covering the photo spacers, wherein the conductive material layer covering the photo spacers is connected to each of the common electrode pads corresponding to each of the photo spacers; and a plurality of liquid crystal molecules filled in the space between the upper substrate and the lower substrate.

9. The LCD of claim 8, wherein the lower substrate further comprises a plurality of TFTs positioned on each intersection of the scan lines and the data lines as switching elements of the pixels.

10. The LCD of claim 8, wherein the lower substrate further comprises an alignment film having a plurality of openings disposed on the common electrodes, and the dimension of each photo spacer plus the dimension of the conductive material layer covering the photo spacer substantially equal to the dimension of each opening so that the alignment film is in contact with the conductive material layer.

11. The LCD of claim 8, wherein the color filters comprise red color filters, green color filters, and blue color filters.

12. The LCD of claim 8 further comprising a polarizer positioned on the upper surface of the upper substrate and a polarizer positioned on the bottom surface of the lower substrate.

13. The LCD of claim 8, wherein each of the pixels contains one of the photo spacers.

14. The LCD of claim 8, wherein the conductive material layer is a transparent ITO layer.

* * * * *